United States Patent
Yuasa et al.

(10) Patent No.: US 9,555,391 B2
(45) Date of Patent: Jan. 31, 2017

(54) CARBON DIOXIDE ADSORBENT

(71) Applicant: Panasonic Corporation, Osaka (JP)

(72) Inventors: Akiko Yuasa, Kyoto (JP); Yasushige Kuroda, Okayama (JP); Atsushi Itadani, Okayama (JP)

(73) Assignee: PANASONIC CORPORATION, Osaka (JP)

( * ) Notice: Subject to any disclaimer, the term of this patent is extended or adjusted under 35 U.S.C. 154(b) by 152 days.

(21) Appl. No.: 14/410,130

(22) PCT Filed: Jun. 25, 2013

(86) PCT No.: PCT/JP2013/003963
§ 371 (c)(1),
(2) Date: Dec. 22, 2014

(87) PCT Pub. No.: WO2014/002482
PCT Pub. Date: Jan. 3, 2014

(65) Prior Publication Data
US 2015/0202592 A1 Jul. 23, 2015

(30) Foreign Application Priority Data
Jun. 25, 2012 (JP) .................. 2012-142209

(51) Int. Cl.
| | | |
|---|---|---|
| B01J 29/06 | (2006.01) | |
| B01J 20/18 | (2006.01) | |
| B01J 29/40 | (2006.01) | |
| C01B 39/38 | (2006.01) | |
| B01D 53/02 | (2006.01) | |
| B01J 20/04 | (2006.01) | |
| B01J 37/30 | (2006.01) | |

(52) U.S. Cl.
CPC ............ B01J 20/18 (2013.01); B01D 53/02 (2013.01); B01J 20/04 (2013.01); B01J 20/186 (2013.01); B01J 29/061 (2013.01); B01J 29/40 (2013.01); C01B 39/38 (2013.01); B01D 2251/406 (2013.01); B01D 2251/408 (2013.01); B01D 2253/108 (2013.01); B01D 2257/504 (2013.01); B01J 37/30 (2013.01); B01J 2229/186 (2013.01); Y02C 10/08 (2013.01); Y02P 20/152 (2015.11)

(58) Field of Classification Search
USPC ............ 502/60, 77, 400, 411, 415; 423/700
See application file for complete search history.

(56) References Cited

U.S. PATENT DOCUMENTS 3,885,927 A 5/1975 Sherman et al.

FOREIGN PATENT DOCUMENTS

| | | |
|---|---|---|
| EP | 0 284 850 | 10/1988 |
| EP | 0 294 588 | 12/1988 |
| JP | 63-278520 | 11/1988 |
| JP | 4-363109 | 12/1992 |
| JP | 7-39752 | 2/1995 |
| JP | 7-96178 | 4/1995 |
| JP | 2013-244442 | 12/2013 |

OTHER PUBLICATIONS

Extended European Search Report issued Jun. 22, 2015 in corresponding European Application No. 13808510.5.
Centi et al., "Removal of $N_2O$ from Industrial Gaseous Streams by Selective Adsorption over Metal-Exchanged Zeolites," Ind. Eng. Chem. Res., 2000, 39, pp. 131-137.
International Search Report issued Sep. 17, 2013 in International (PCT) Application No. PCT/JP2013/003963.
Wirawan et al., "Multicomponent $H_2/CO/CO_2$ adsorption on BaZSM-5 zeolite", Separation and Purification Technology, vol. 52, 2006, pp. 224-231.

*Primary Examiner* — Elizabeth Wood
(74) *Attorney, Agent, or Firm* — Wenderoth, Lind & Ponack, L.L.P.

(57) ABSTRACT

Provided is a carbon dioxide adsorbent with which large quantities of carbon dioxide can be adsorbed and removed even under conditions having low carbon dioxide concentrations such as when under subatmospheric pressure or when under an environment having a carbon dioxide partial pressure of less than atmospheric pressure, said carbon dioxide adsorbent exhibiting excellent adsorption activity. A carbon dioxide adsorbent including at least a ZSM-5 zeolite including barium (Ba) or strontium (Sr) is characterized in that the ZSM-5 zeolite includes M-O-M bonds (M being Ba or Sr, and O being oxygen). The M-O-M bonds interact strongly with carbon dioxide, and thus carbon dioxide can be adsorbed effectively and in large volumes even under conditions having low carbon dioxide concentrations.

2 Claims, 9 Drawing Sheets

CARBON DIOXIDE ADSORBENT

TECHNICAL FIELD

The present invention relates to a carbon dioxide absorbent that can absorb a large volume of carbon dioxide in a pressure range not higher than atmospheric pressure.

BACKGROUND ART

Absorbents that can absorb carbon dioxide have been used in various fields, for example, for concentration of carbon dioxide by PSA method and for absorption of carbon dioxide contained in the combustion exhaust gases from electric power plants. Examples of the carbon dioxide absorbents used for such purposes include activated carbon, various synthetic zeolites such as synthetic zeolite 13X, and the like.

For absorption of carbon dioxide, proposed was a zeolite-based carbon dioxide absorbent wherein 2 to 80 equivalent % of the cations thereof were replaced with Ba ions, which was prepared by immersing an zeolite in an aqueous solution containing a water-soluble Ba salt (see, for example, Patent Document 1). This material is a material suited for concentration and separation of carbon dioxide by PSA method and it is designed to have a larger ratio of carbon dioxide- to nitrogen-absorbing capacity. The zeolite used is, for example, a Na-A zeolite.

Alternatively as an absorbent for absorption of hydrocarbons in the exhaust gases from internal-combustion engines, proposed were zeolite-based hydrocarbon absorbents carrying at least one metal component selected from Ag, Cu, Ni, Zn, Ba, and Mg on the surface (see, for example, Patent Document 2). It is described that ZSM-5, mordenite, or Y zeolite carrying an Ag component at an ion exchange rate of 10% or more is particularly favorable for increase of desorption temperature.

Also proposed was a zeolite-based chlorine gas absorbent containing an alkali metal or alkali-earth metal (see, for example, Patent Document 3). In particular, it is an absorbent used for concentration and separation of chlorine gas by PSA method and, for example, Y or 13X zeolite ion-exchanged with Ca, Ba, or Li ions.

PRIOR ART DOCUMENT

Patent Documents

[Patent Document 1] JP-A-No. H07-039752
[Patent Document 2] JP-A-No. H07-096178
[Patent Document 3] JP-A-No. H04-363109

DISCLOSURE OF THE INVENTION

Problems to be Solved by the Invention

However, it was not possible by traditional technology to achieve a sufficiently high carbon dioxide-absorbing capacity under a dilute carbon dioxide condition such as an environment where the carbon dioxide partial pressure is relatively low or an environment under reduced pressure.

Although the absorbent described in Patent Document 1 is useful as a carbon dioxide absorbent in a pressure range of atmospheric pressure or higher, it had a low carbon dioxide-absorbing activity under reduced pressure and does not have a sufficiently high carbon dioxide-absorbing capacity.

Alternatively, although the absorbent described in Patent Document 2 is useful as a hydrocarbon absorbent, it had a low carbon dioxide-absorbing activity under reduced pressure and does not have a sufficiently high carbon dioxide-absorbing capacity.

Yet alternatively, although the absorbent described in Patent Document 3 is useful when chlorine gas is concentrated and separated by PSA method, it had a low carbon dioxide-absorbing activity under reduced pressure and does not have a sufficiently high carbon dioxide-absorbing capacity.

An object of the present invention is to provide a carbon dioxide absorbent that can solve the problems of conventional absorbents, i.e., a carbon dioxide absorbent that absorbs and immobilizes carbon dioxide in an amount larger than that by conventional existing absorbent even under a dilute carbon dioxide condition such as an environment where the carbon dioxide partial pressure is relatively low or an environment under reduced pressure.

Solutions to the Problems

As described above, synthetic zeolites are known to absorb carbon dioxide. In addition, it is easily contemplated that a zeolite containing an alkali metal or alkali-earth metal, which generally has affinity to an acidic gas (carbon dioxide), can be used as a carbon dioxide absorbent.

However, it was not possible to obtain a sufficiently high carbon dioxide-absorbing capacity under a dilute carbon dioxide condition such as an environment where the carbon dioxide partial pressure is relatively low or an environment under reduced pressure, by using a zeolite simply containing an alkali metal or alkali-earth metal, as in traditional technology.

After intensive studies, the inventors have found that, when a ZSM-5 zeolite contains a M-O-M species (M being Ba or Sr, and O being oxygen), the M-O-M species can interact strongly with carbon dioxide under a dilute carbon dioxide condition such as an environment where the carbon dioxide partial pressure is relatively low or an environment under reduced pressure and the ZSM-5 zeolite can thus absorb a large-volume of carbon dioxide, and made the present invention.

Accordingly, the carbon dioxide absorbent according to the present invention is a carbon dioxide absorbent of ZSM-5 zeolite containing at least Ba or Sr, wherein the ZSM-5 zeolite contains a M-O-M species (M being Ba or Sr, and O being oxygen).

Effect of the Invention

As the M-O-M species in the ZSM-5 zeolite interacts strongly with carbon dioxide, The ZSM-5 zeolite according to the present invention absorbs carbon dioxide tightly, permitting absorption of a large volume of carbon dioxide even under a dilute carbon dioxide condition. It is thus possible to provide a high-activity carbon dioxide absorbent that can absorb and remove carbon dioxide highly efficiently even under a dilute carbon dioxide condition such as an environment under reduced pressure or an environment where the carbon dioxide partial pressure is lower than atmospheric pressure.

MODE FOR CARRYING OUT THE INVENTION

Hereinafter, favorable embodiments of the present invention will be described with reference to drawings. However, it should be understood that the following embodiments are only examples and the present invention is not limited only to the following embodiments.

The present invention relates to a carbon dioxide absorbent containing a ZSM-5 zeolite containing at least Ba or Sr, wherein the ZSM-5 zeolite contains a M-O-M species (M being Ba or Sr, and O being oxygen).

The M-O-M species used in the present invention is a Ba—O—Ba or Sr—O—Sr species, i.e., a reaction site having a Ba—O—Ba or Sr—O—Sr bond wherein two Ba or Sr atoms are crosslinked with one oxygen atom. Such a species is introduced, for example, by ion exchanging.

The Ba or Sr atoms in the Ba—O—Ba or Sr—O—Sr species are bound to O (oxygen) atoms in the zeolite skeleton, forming a —O—Ba—O—Ba—O— or —O—Sr—O—Sr—O— bond. In the bonding state, the Ba and Sr atoms are positively polarized ($\delta^+$) and the O atoms between Ba or Sr atoms are negatively polarized ($\delta^-$).

Alternatively in carbon dioxide molecule, the C (carbon) atom is positively polarized ($\delta^+$), while the O atoms are negatively polarized ($\delta^-$). The O atom in carbon dioxide molecule interacts electrostatically with the Ba or Sr atoms, enabling large-volume absorption of carbon dioxide even under a dilute carbon dioxide condition.

In addition, the positively polarized C ($\delta^+$) atom in the carbon dioxide molecule can interact electrostatically and also partially covalently with the negatively polarized O ($\delta^-$) atoms between Ba or Sr atoms, possibly increasing the carbon dioxide-absorbing capacity.

The covalent interaction can be estimated quantitatively by molecular orbital simulation, based on experiment data obtained by X-Ray Absorption Fine Structure (XAFS) analysis.

On the other hand, although the detailed mechanism is yet to be understood, if Mg and Ca, which are both alkali-earth metal oxides, are used for ion exchanging of ZSM-5 zeolite, they do not form the M-O-M species. Thus, ZSM-5 zeolites carrying these metals apparently do not interact with carbon dioxide, as compared with those with Ba and Sr, and thus have a smaller absorption capacity.

Although the M-O-M species is detectable in infrared absorption (FT-IR) spectra or by X-Ray Absorption Fine Structure (XAFS) analysis, the action and effect of the M-O-M species will be described below, using FT-IR spectra.

Hereinafter, the invention will be described, as the FT-IR spectrum (FIG. 1A, b) of a Ba-containing ZSM-5 zeolite according to the present invention (hereinafter, referred to as BaZSM-5 zeolite) containing Ba—O—Ba species, which was prepared by ion-exchanging NaZSM-5 zeolite with Ba, and the FT-IR spectrum (FIG. 2A, b) of a Mg-containing ZSM-5 zeolite (hereinafter, referred to as MgZSM-5 zeolite), which was prepared by ion-exchanging NaZSM-5 zeolite with Mg are compared.

Figure 1A:
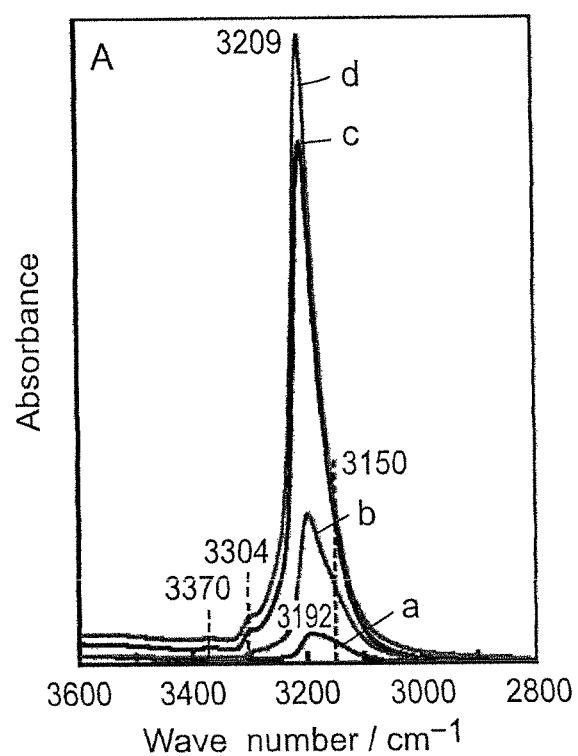
FIG. 1A is a FT-IR spectrum of an inventive BaZSM-5 zeolite containing acetylene absorbed as probe.
Figure 2A:
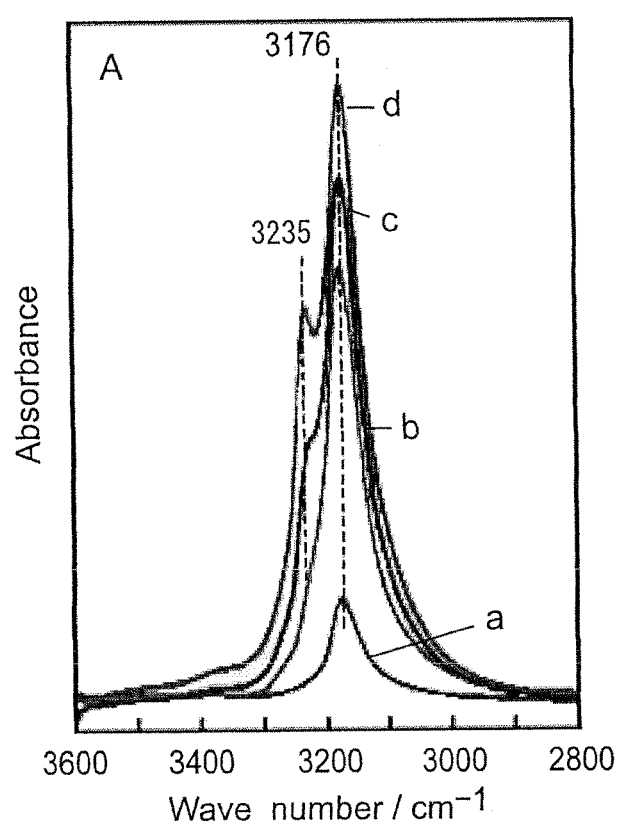
FIG. 2A is a FT-IR spectrum of a comparative MgZSM-5 zeolite containing acetylene absorbed as probe.

FIG. 1A, b and FIG. 2A, b are respectively FT-IR spectra of ZSM-5 zeolites containing acetylene absorbed as probe at 25° C. First, the reason for using acetylene as probe will be described.

The BaZSM-5 zeolite according to the present invention is known to show favorable absorption properties to acetylene, but it was found that, when the BaZSM-5 zeolite according to the present invention was allowed to absorb acetylene and additionally carbon dioxide, the carbon dioxide-absorbing capacity thereof decreased by the molar amount equivalent to the acetylene-absorbing capacity. Accordingly, acetylene was used as the probe, assuming that the absorption site for carbon dioxide is identical with that for acetylene.

Figure 1B:
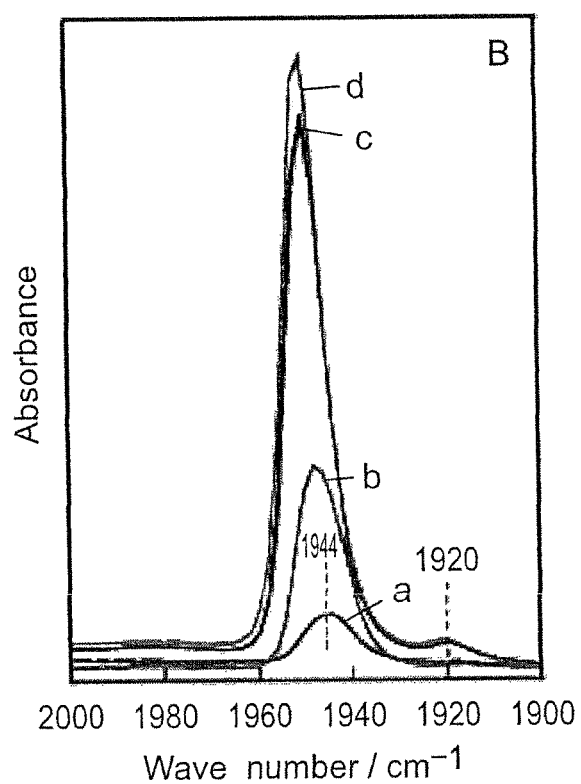
FIG. 1B is a FT-IR spectrum of another inventive BaZSM-5 zeolite containing acetylene absorbed as probe.
Figure 2B:
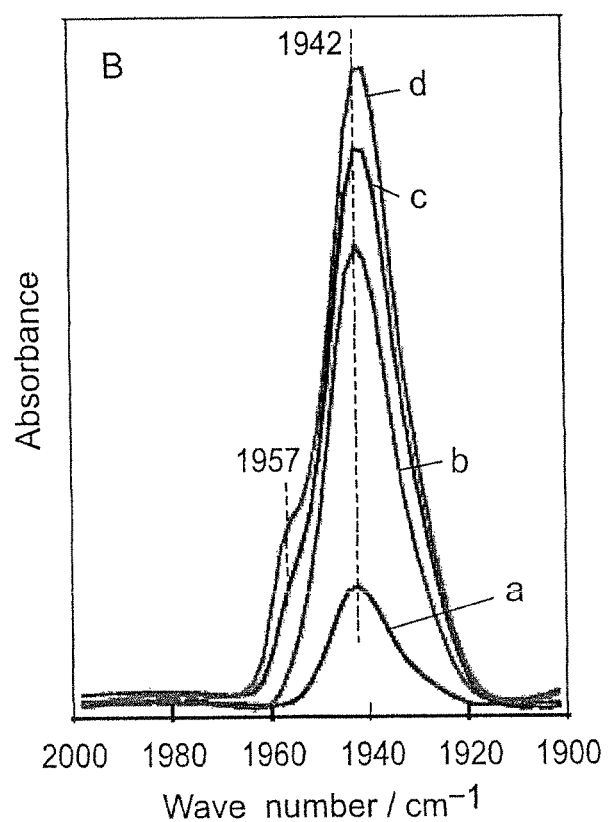
FIG. 2B is a FT-IR spectrum of another comparative MgZSM-5 zeolite containing acetylene absorbed as probe.

FIGS. 1A and 1B and also FIGS. 2A and 2B show IR bands at around 3200 cm$^{-1}$ which correspond to acetylene C-H stretching vibration (FIGS. 1A and 2A) and IR bands at around 1950 cm$^{-1}$ which correspond to C≡C stretching vibration (FIGS. 1B and 2B). These spectra are difference spectra of BaZSM-5 zeolite which were obtained by subtracting the spectra thereof before acetylene absorption. The IR band, as used in the present invention, means an absorption band in infrared absorption spectrum and may be abbreviated simply to the band.

FIGS. 1A and 1B show the change of FT-IR spectra, when the partial pressure of acetylene to be absorbed on BaZSM-5 zeolite is gradually increased at room temperature. When the partial pressure of acetylene is increased, the intensity of the band at around 3200 cm$^{-1}$ increased (band: a→b→c→d in Figure). The results indicate that the acetylene-absorbing capacity increases as the partial pressure of acetylene is raised.

Notably in FIG. 1A, bands at 3370 and 3304 cm$^{-1}$ appeared when the acetylene-absorbing capacity increased.

In FIG. 1B, there was observed at 1944 cm$^{-1}$ a band (a) possibly corresponding to the C≡C stretching vibration of acetylene absorbed on BaZSM-5. The band shifted upward toward the high frequency side (i.e., b→c→d), as the pressure of acetylene was increased. Since acetylene is a symmetrical molecule, distinct observation of a band of C≡C stretching vibration, which is essentially IR-inactive, indicates the presence of strong interaction between the BaZSM-5 zeolite and acetylene.

It is to be noted that the band shift toward the high frequency side was observed simultaneously with the appearance of a band at 1920 cm$^{-1}$ and the bands at 3370 and 3304 cm$^{-1}$ shown in FIG. 1A (see the bands of b, c, and d).

On the other hand, it is reported in Phy. Chem. Chem. Phys., 2003, 5, 4718-4723 that, in the cases of an oxide such as $SiO_2$, $TiO_2$, CaO, MgO, $Al_2O_3$, $Ga_2O_3$, $La_2O_3$, and $ZrO_2$, if the M-O-M species (M: metal ion, O: oxygen) are present in the sample, the M sites therein interact with acetylene, forming acetylide species (H—C≡C-M). The literature also describes that the acetylide species formed has a band of C—H vibration at around 3302-3245 cm$^{-1}$ and a band of C≡C vibration at around 2030-1890 cm$^{-1}$.

If the results in the literature are taken into consideration, the IR bands at 3304 cm$^{-1}$ and 1920 cm$^{-1}$, which are characteristic of the BaZSM-5 zeolite according to the present invention, may be assigned to the acetylide species formed in reaction between the Ba—O—Ba species and acetylene.

Alternatively, the band at 3370 cm$^{-1}$ can be assigned to the OH stretching vibration of H—C≡C—Ba—(OH)—Ba, which is formed in reaction between the hydrogen eliminated during formation of the acetylide species and the Ba—O—Ba oxygen.

Figure 3:
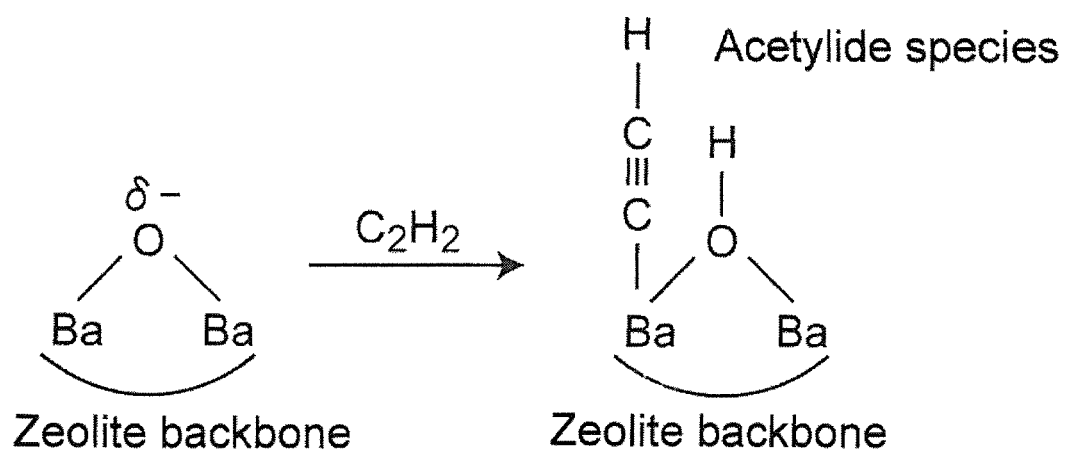
FIG. 3 is a molecular model explaining acetylene absorption in the present invention.

Such a reaction is considered to be a thermodynamically stable reaction, because, as the O atom in the Ba—O—Ba species is negatively polarized ($\delta^-$), the H (hydrogen) atom in acetylene molecule can bind to it easily. The molecular model based on this assignment is shown in FIG. 3.

In addition, the IR band that can be assigned to the acetylide species did not disappear even when the acetylene-absorbed BaZSM-5 was left under vacuum at room temperature, indicating that acetylene reacted tightly with the Ba—O—Ba species forming the acetylide species.

These results show that the Ba—O—Ba species in the BaZSM-5 zeolite according to the present invention is strong absorption-active site for acetylene.

In addition, when a ZSM-5 zeolite containing Ba—O—Ba species is allowed to absorb acetylene and then carbon dioxide, the carbon dioxide-absorbing capacity decreases by the molar amount equivalent to the acetylene-absorbing capacity. The results indicate that the absorption site for carbon dioxide is identical with that for acetylene.

Thus, the Ba—O—Ba species in the BaZSM-5 zeolite according to the present invention is considered to be the active site for absorption of carbon dioxide.

Figure 4:
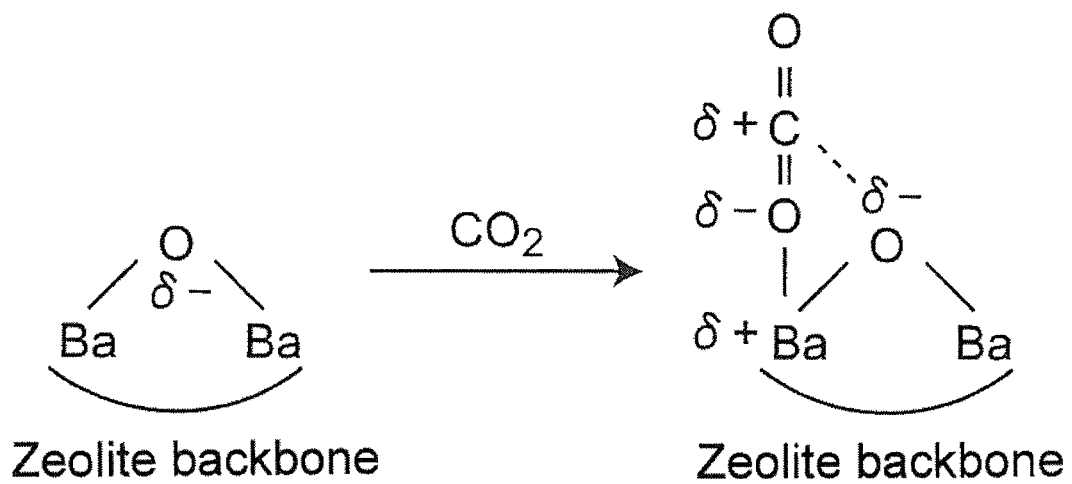
FIG. 4 is a molecular model explaining carbon dioxide absorption in the present invention.

The molecular model for absorption of carbon dioxide by the Ba—O—Ba species is shown in FIG. 4. As described above, the Ba atoms in —Ba—O—Ba— are positively polarized ($\delta^+$) and the O atom present between Ba or Sr atoms negatively polarized ($\delta^-$).

On the other hand, the C (carbon) atom in carbon dioxide molecule is positively polarized ($\delta^+$) and the O atoms negatively polarized ($\delta^-$) and thus, the O atoms in carbon dioxide molecule interacts electrostatically with the Ba or Sr atoms, leading to absorption of carbon dioxide in the molecular state on the Ba atoms by the interaction.

Additionally, the positively polarized C ($\delta^+$) in carbon dioxide molecule can also interacts electrostatically with the negatively polarized O ($\delta^-$) atom present between Ba or Sr atoms, leading to tighter absorption of carbon dioxide and increase of the chemical absorption volume, as will be defined in Examples below.

Alternatively in FIGS. 2A and 2B of the MgZSM-5 zeolite, the appearance of the IR bands at 3304 cm$^{-1}$ and 1920 cm$^{-1}$, i.e., IR bands corresponding to acetylide species, which is characteristic of the BaZSM-5 zeolite, was not observed, in contrast to the BaZSM-5 zeolite. It was thus found that, in contrast to the BaZSM-5, there was no M-O-M species formed in the MgZSM-5 zeolite.

The results indicate that there is a difference in the presence state of the metal ions between BaZSM-5 and MgZSM-5 zeolites and thus, in contrast to the ZSM-5 zeolite containing the M-O-M species (M being Ba or Sr, and O being oxygen), the MgZSM-5 zeolite does not absorb a large volume of carbon dioxide under reduced pressure.

In the present invention, the ion exchange rate of the ZSM-5 zeolite with Ba or Sr was set to 60% or more, higher than that explained in Comparative Examples 1 to 5 described below, and more preferably to 80% or more, as will be described in Examples 1 to 7.

$Al_2O_3$ and $SiO_2$ form the zeolite skeleton in ZSM-5 zeolite. Because Si atom is more electronegative than Al atom, the Al atoms therein are positively charged electrostatically. Thus, the O atoms in the Al-bound zeolite skeleton are negatively charged electrostatically and show a property of withdrawing metal cations. The negatively charged O atoms provide ion exchange sites. One monovalent cation is ion-exchanged at one O site and a bivalent cation is ion-exchanged by two O atoms, as it is crosslinked.

Because the Ba or Sr atom is normally a bivalent ion, one bivalent Ba ion is calculated to be ion-exchanged with two negatively charged O atoms, and thus, the ion exchange rate of a Ba- or Sr-containing ZSM-5 zeolite normally has an ion exchange rate of not more than 100%.

However when Ba or Sr atoms are contained in the form of M-O-M, as in the present invention, two M atoms are introduced to two negatively charged O atoms in the zeolite skeleton. Thus, the ion exchange rate can be calculated to be more than 100%.

The ion exchange rate is generally determined, using the molar ratio calculated from the atomic ratio determined by ICP emission spectral analysis. In the case of the present invention wherein one bivalent Ba or Sr ion is calculated to be ion-exchanged by two negatively charged Al atom-derived O atoms, it can be calculated by the following equation: (Molar ratio of Ba or Sr atoms)/(Molar ratio of Al atoms)×2

Hereinafter, the present invention will be exemplified, as Ba is used as the metal.

When the ion exchange rate is relatively low, one bivalent Ba ion is ion-exchanged by two negatively charged O atoms and thus the Ba—O—Ba species are hardly formed. Alternatively when the ion exchange rate increases, the Ba ion is ion-exchanged as a (Ba—OH)$^+$ ion by one negatively charged O atom and the Ba—O—Ba species are formed in later dehydration reaction under heat, although the detailed mechanism is yet to be understood. The same applies to the case where Sr is used.

Thus in the present invention, the ion exchange rate is desirably higher, as the carbon dioxide-absorbing capacity increases when the M-O-M species is contained in a greater amount. The carbon dioxide-absorbing capacity becomes greater than that of traditional technology when the ion exchange rate is in the range of 80% or more. It is more preferably in a range of 100% or more. Although the upper limit thereof is theoretically 200%, it may become more than 200%, if there are metal species deposited on the zeolite in addition to those bound to the ion exchange sites.

In the present invention, the presence of M-O-M species (M being Ba or Sr, and O being oxygen) in the ZSM-5 zeolite can be confirmed by analyzing the IR spectrum after acetylene absorption.

As described above, as the carbon dioxide absorbent according to the present invention has a carbon dioxide-absorbing capacity decreased by the molar amount equivalent to the acetylene-absorbing capacity when it is allowed to absorb acetylene and then carbon dioxide, the absorption site (M-O-M species) for carbon dioxide seems to be identical with the absorption site for acetylene.

It is thus possible by using acetylene as probe to confirm the presence of the M-O-M species in the carbon dioxide absorbent of the present invention and to confirm that it has high carbon dioxide-absorbing activity.

The presence of M-O-M species, as used herein, means that the bands corresponding to C—H and C≡C vibrations of acetylide species (H—C≡C-M) are observable by FT-IR method at a peak intensity of more than its detection limit.

(Preparative Method)

Figure 5:
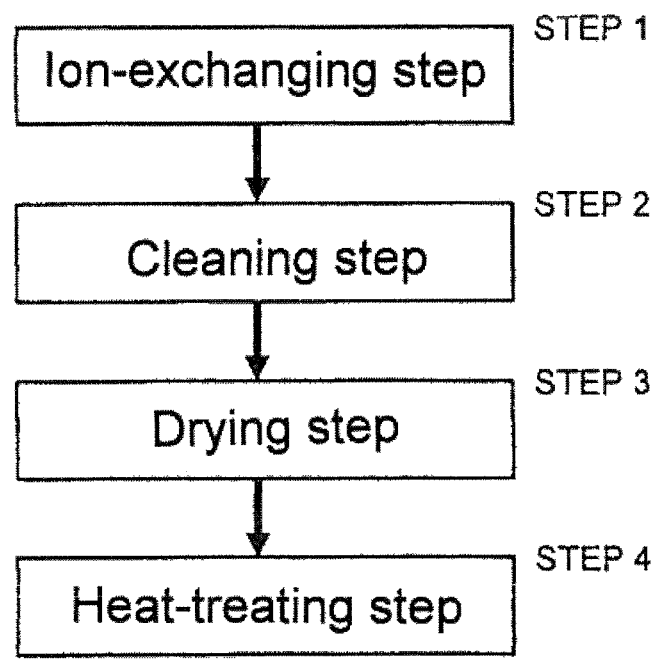
FIG. 5 is a flow chart showing an example of the method for producing the carbon dioxide absorbent in one embodiment of the present invention.

FIG. 5 is a flow chart showing an example of the method for producing a carbon dioxide absorbent according to the present invention, specifically a BaZSM-5 zeolite.

The production method comprises at least an ion-exchanging step using an ion exchange solution containing Ba ions (STEP 1), a cleaning step of cleaning the Ba ion-exchanged ZSM-5 zeolite (STEP 2), a drying step (STEP 3), and a heat-treating process at a temperature higher than that in the drying step (STEP 4).

The ZSM-5 zeolite for use as raw material may be a commercially available material, but the $SiO_2/Al_2O_3$ ratio thereof is desirably 10 or more and 100 or less. It is because it is theoretically difficult to prepare a ZSM-5 zeolite having a $SiO_2/Al_2O_3$ ratio of less than 10 and, alternatively when the $SiO_2/Al_2O_3$ ratio is more than 100, the number of the Al atoms contained in the ZSM-5 zeolite decreases, making it difficult to form the Ba—O—Ba species and thus leading to decrease of the carbon dioxide-absorbing capacity.

In the ion-exchanging step (STEP 1), an aqueous solution containing a common water-soluble barium compound such as barium acetate, barium nitrate, or barium chloride dihydrate may be used as the Ba ion-containing solution. The frequency of ion exchanging, the concentration of the aqueous solution, the period and temperature of ion exchanging, and others are not particularly limited, but the ion exchange rate is preferably 80% or more for achieving favorable absorbance. It is more preferably 100% or more.

The ion exchange rate is a value calculated on an assumption that one $Ba^{2+}$ ion is ion-exchanged by two monovalent cations and, if Ba atoms are contained in the state of Ba—O—Ba, it may be calculated to be more than 100%.

In the cleaning step (STEP 2), distilled water is desirably used for cleaning.

The ion-exchanged zeolite is desirably dried under a temperature condition of lower than 100° C. in the drying step (STEP 3). The temperature may be room temperature (10° C. to 30° C.).

It is heat-treated in the heat-treating process (STEP 4) at a temperature higher than that in the drying step, preferably 250° C. or higher and 800° C. or lower, forming the M-O-M species by dehydration. This step is preferably carried out under reduced pressure, more preferably at a pressure of less than $10^{-5}$ Pa.

The period of heat treatment varies according to the amount of the BaZSM-5 zeolite used, but should be a period longer than a particular value for formation of the Ba—O—Ba species by removal of one water molecule from two Ba—OH bonds. Heat treatment at a temperature of 250° C. or higher and 800° C. or lower is preferable, because the dehydration reaction may become insufficient at a temperature of lower than 250° C. and the zeolite structure may be disrupted at a temperature of higher than 800° C.

The carbon dioxide absorbent prepared in this way is a carbon dioxide absorbent of ZSM-5 zeolite composition containing at least Ba, wherein the ZSM-5 zeolite contains Ba—O—Ba species, that can absorb and immobilize carbon dioxide in a larger volume than traditional absorbents. In addition, it can absorb carbon dioxide more tightly.

Similarly, it is also possible to produce a carbon dioxide absorbent containing Sr—O—Sr species in ZSM-5 zeolite, using a Sr ion-containing ion exchange solution and such a zeolite shows favorable effects similar to those of the BaZSM-5 zeolite above.

The carbon dioxide absorbent according to the present invention absorb and remove carbon dioxide effectively under a condition where carbon dioxide is dilute, in particular in an environment under reduced pressure or an environment where the carbon dioxide partial pressure is lower than atmospheric pressure, but it may be used in combination with other carbon dioxide absorbents for absorption of carbon dioxide at a partial pressure in a wider range. For example, it may be used together with various other zeolites or with chemical carbon dioxide absorbents such as alkali metal hydroxides.

EXAMPLES

Hereinafter, the present invention will be described more in detail with reference to Examples, but it should be understood that the present invention is not limited to the following Examples.

(Preparation of Carbon Dioxide Absorbent)

The ZSM-5 zeolite used as raw material is a Na-type zeolite having a $SiO_2/Al_2O_3$ ratio of 23.8. In preparation of the absorbent above, an ion exchange solution containing Ba or Sr ions was used and heat treatment was carried out at 600° C. for 4 hours.

(Evaluation of Carbon Dioxide-Absorbing Properties)

The carbon dioxide-absorbing properties were evaluated by determining carbon dioxide-absorbing capacities at equilibrium pressures of 132000 Pa, 13200 Pa, 300 Pa, and 10 Pa and the chemical absorption volume for carbon dioxide at an equilibrium pressure of 10 Pa. The atmospheric pressure then was 101325 Pa. An equilibrium pressure of 132000 Pa was considered to be slightly pressurized, while an equilibrium pressure of 13200 Pa or less was considered to be a reduced pressure.

The carbon dioxide-absorbing capacity was determined on Autosorb 1-C (manufactured by Quantachrome) that can determine gas absorption volume.

Hereinafter, the method of determining the carbon dioxide-absorbing capacity will be described. First, the sample to be tested is weighed. It is then placed in a sample tube having a known volume. The sample tube is then connected to a manifold having a known volume via an on-off valve (cock). The manifold and the sample tube are then heated to the test temperature. As the test is carried out at 25° C. in the present Example, the manifold is placed in a constant-temperature oven and the sample tube in a constant-temperature water bath for regulation of the temperature. The manifold and the sample tube is then evacuated to an internal pressure of $1 \times 10^{-3}$ Pa or less, as the on-off valve is left open. The on-off valve is then closed and a particular amount of carbon dioxide is introduced into the manifold. It is the amount that gives a predetermined pressure when the on-off valve is opened after the same operation is repeated in the state where there is no sample in the sample tube. For example when the absorption volume is determined at a pressure of 10 Pa, as will be described below, carbon dioxide is introduced into the manifold and the sample tube to a manifold internal pressure of slightly higher than 10 Pa. The on-off valve is opened in the state, making carbon dioxide introduced through the manifold into the sample tube and the pressure in the manifold is determined after a particular time. The absorption volume is determined by calculating the amount of carbon dioxide absorbed in the sample from the pressure loss then and dividing the absorption amount by the weight of the sample previously determined.

The chemical absorption volume is the amount obtained by subtracting, from the amount of carbon dioxide absorbed in the sample in the measurement above (primary absorption volume), the amount of carbon dioxide absorbed in the sample, when the sample after the primary absorption is evacuated to a vacuum at $1 \times 10^{-3}$ Pa or less and allowed to absorb carbon dioxide once again by the same procedure (secondary absorption volume). The chemical absorption volume determines the amount of carbon dioxide that is not removed by vacuum evacuation and thus, an absorbent having a larger chemical absorption volume is a material that can absorb carbon dioxide more effectively.

In the Examples below, the carbon dioxide-absorbing properties of the Ba- or Sr-containing ZSM-5 zeolites were evaluated, as the condition of the ion exchange solution containing Ba or Sr ions, the frequency of ion exchanging, and others were altered. The results are shown in Examples 1 to 7. Results obtained by using a conventional synthetic zeolite are shown in Comparative Examples 1 to 5.

The ion exchange rate in the following Examples and Comparative Examples can be adjusted by modifying the concentration and temperature of the ion exchange solution. As there is no particular theory on the relationship between the concentration and temperature of the ion exchange solution and the ion exchange rate and the ion exchange rates are often unverifiable after conversion to product, only verifiable ion exchange rates are shown.

The amount of carbon dioxide absorbed in the sample (absorption volume) shown in the following description is the volume in the standard state at 25° C. and one atmospheric pressure.

Example 1

Preparative Method

A BaZSM-5 zeolite was prepared by using an aqueous $BaCl_2$ solution as ion exchange solution and cleaning and drying the resulting zeolite.
(Results)

The preparative conditions and the test results of carbon dioxide-absorbing properties in the present Example are shown in Table 1. In addition, the preparative conditions and the test results of carbon dioxide-absorbing properties in the Comparative Example are shown in Table 2.

The ion exchange rate in the present Example was 150%.

FT-IR analysis using absorbed acetylene as probe confirmed the presence of Ba—O—Ba species.

After the zeolite was heat-treated and then cooled to 25° C., the carbon dioxide-absorbing properties of the zeolite was evaluated, showing that the carbon dioxide-absorbing capacity was 73.1 cc/g at 132000 Pa, 37.0 ml/g at 13200 Pa, 24.7 ml/g at 300 Pa, and 13.4 cc/g at 10 Pa. The chemical absorption volume at 10 Pa was 7.2 ml/g.

Comparison with the results in Comparative Examples 1 to 5 showed that the carbon dioxide-absorbing capacity of the zeolite was superior at an equilibrium pressure of 13200 Pa or less.

Specifically, in particular, the amount of $CO_2$ absorbed at 300 Pa was 24.7 ml/g, which is 135% of the maximum value (17.8 ml/g) in Comparative Examples 1 to 5. Alternatively, the amount of $CO_2$ absorbed at 10 Pa was 13.4 ml/g, which is 326% of the maximum value in Comparative Examples 1 to 5 (4.1 ml/g of Comparative Example 5)

As described above, the zeolite was superior to the absorbents of Comparative Examples in the low pressure range.

In addition, the chemical absorption volume at 10 Pa was very favorable and the amount of chemical absorption at 300 Pa was 7.2 ml/g, which is 600% of (i.e., 6 time larger than) the maximum value (1.2 ml/g) in Comparative Examples 1 to 5

The results above indicate definitely that the favorable effects of the carbon dioxide absorbent in the present Example are amplified, compared to those of Comparative Examples, when the equilibrium pressure is reduced.

It is because, as the Ba—O—Ba species interacts strongly with carbon dioxide, the ZSM-5 zeolite according to the present invention absorbs carbon dioxide tightly, permitting absorption of a large volume of carbon dioxide even under a condition where the equilibrium pressure is low, i.e., carbon dioxide is dilute. Although the ratio of the absorption amount in Example to that in Comparative Example is not given to all Examples, it is an effective indicator that can be calculated easily, showing that the advantageous effects of the present invention are amplified when the pressure is lower.

Example 2

Preparative Method

A BaZSM-5 zeolite was prepared by using an aqueous $BaCl_2$ solution as ion exchange solution and cleaning and drying the resulting zeolite.
(Results)

The preparative conditions and the test results of carbon dioxide-absorbing properties in the present Example are shown in Table 1. The ion exchange rate was 120%. FT-IR analysis using absorbed acetylene as probe confirmed the presence of Ba—O—Ba species.

After the zeolite was heat-treated and then cooled to 25° C., the carbon dioxide-absorbing properties of the zeolite was evaluated, showing that the carbon dioxide-absorbing capacity was 64.8 cc/g at 132000 Pa, 35.0 ml/g at 13200 Pa, 23.8 ml/g at 300 Pa, 11.5 cc/g at 10 Pa. The chemical absorption volume at 10 Pa was 4.8 ml/g.

It was shown that the carbon dioxide-absorbing capacity of the zeolite was superior at an equilibrium pressure of 13200 Pa or less, compared to those of Comparative Examples 1 to 5. In particular, the zeolite was superior to the absorbents of Comparative Examples in the low-pressure ranges at 300 Pa and 10 Pa. In addition, the chemical absorption volume thereof was very favorable at 10 Pa.

It is because, as the Ba—O—Ba species interacts strongly with carbon dioxide, the ZSM-5 zeolite according to the present invention absorbs carbon dioxide tightly, permitting absorption of a large volume of carbon dioxide even under a condition where the equilibrium pressure is low, i.e., carbon dioxide is dilute.

The carbon dioxide-absorbing capacity thereof was lower than that of Example 1, probably because the ion exchange rate was relatively low.

Example 3

Preparative Method

A BaZSM-5 zeolite was prepared by using an aqueous $BaCl_2$ solution as ion exchange solution and cleaning and drying the resulting zeolite.
(Results)

The preparative conditions and the test results of carbon dioxide-absorbing properties in the present Example are shown in Table 1. The ion exchange rate was 80%. FT-IR analysis using absorbed acetylene as probe confirmed the presence of Ba—O—Ba species.

After the zeolite was heat-treated and then cooled to 25° C., the carbon dioxide-absorbing properties of the zeolite was evaluated, showing that the carbon dioxide-absorbing capacity was 59.0 cc/g at 132000 Pa, 32.0 ml/g at 13200 Pa, 19.0 ml/g at 300 Pa, and 6.2 cc/g at 10 Pa. The chemical absorption volume at 10 Pa was 3.4 ml/g.

It was shown that the carbon dioxide-absorbing capacity of the zeolite was superior at an equilibrium pressure of 13200 Pa or less, compared to those of Comparative Examples 1 to 5. In particular, the zeolite was superior to the absorbents of the Comparative Examples in the low-pressure ranges at 300 Pa and 10 Pa. In addition, the chemical absorption volume thereof was very favorable at 10 Pa.

It is because, as the Ba—O—Ba species interacts strongly with carbon dioxide, the ZSM-5 zeolite according to the present invention absorbs carbon dioxide tightly, permitting absorption of a large volume of carbon dioxide even under a condition where the equilibrium pressure is low, i.e., carbon dioxide is dilute.

The carbon dioxide-absorbing capacity thereof was lower than that of Example 2, probably because the ion exchange rate was relatively low.

In Examples 1 to 3, BaZSM-5 zeolites were compared, as the same ion exchange solution was used and the ion exchange rate altered, as described above. When the aqueous $BaCl_2$ solution was used, it was found that the amount of $CO_2$ absorbed increased, as the ion exchange rate was raised.

When the amount of chemical absorption at 10 Pa is 3.4 ml/g, as in the present Example, the absorbent, if installed in a device used in low-pressure range, can show an absorption volume twice or more higher than that of conventional absorbents.

Advantageously as shown in Examples 1 and 2, it is possible according to the present invention to provide a high-performance product having higher absorption capacity.

Example 4

Preparative Method

A BaZSM-5 zeolite was prepared, by ion-exchanging ZSM-5 zeolite once with an aqueous $Ba(NO_3)_2$ solution as ion exchange solution and cleaning and drying the resulting zeolite.

(Results)

The preparative conditions and the test results of carbon dioxide-absorbing properties in the present Example are shown in Table 1. The ion exchange rate was 110%. FT-IR analysis using absorbed acetylene as probe confirmed the presence of Ba—O—Ba species.

After the zeolite was heat-treated and then cooled to 25° C., the carbon dioxide-absorbing properties of the zeolite was evaluated, showing that the carbon dioxide-absorbing capacity was 70.1 cc/g at 132000 Pa, 37.0 ml/g at 13200 Pa, 25.2 ml/g at 300 Pa, and 12.0 cc/g at 10 Pa. The chemical absorption volume at 10 Pa was 5.7 ml/g.

It was shown that the carbon dioxide-absorbing capacity of the zeolite was superior at an equilibrium pressure of 13200 Pa or less (around atmospheric pressure), compared to those of Comparative Examples 1 to 5. In particular, the zeolite was superior to the absorbents of the Comparative Examples in the low-pressure ranges at 300 Pa and 10 Pa. In addition, the chemical absorption volume thereof was very favorable at 10 Pa.

It is because, as the Ba—O—Ba species interacts strongly with carbon dioxide, the ZSM-5 zeolite according to the present invention absorbs carbon dioxide tightly, permitting absorption of a large volume of carbon dioxide even under a condition where the equilibrium pressure is low, i.e., carbon dioxide is dilute.

Example 5

Preparative Method

A BaZSM-5 zeolite was prepared by ion-exchanging ZSM-5 zeolite with an aqueous $Ba(CH_3COO)_2$ solution as ion exchange solution and cleaning and drying the resulting zeolite.

(Results)

The preparative conditions and the test results of carbon dioxide-absorbing properties in the present Example are shown in Table 1. The ion exchange rate was 117%. FT-IR analysis using absorbed acetylene as probe confirmed the presence of Ba—O—Ba species.

After the zeolite was heat-treated and then cooled to 25° C., the carbon dioxide-absorbing properties of the zeolite was evaluated, showing that the carbon dioxide-absorbing capacity was 62.5 cc/g at 132000 Pa, 34.5 ml/g at 13200 Pa, 23.6 ml/g at 300 Pa, and 10.9 cc/g at 10 Pa. The chemical absorption volume at 10 Pa was 4.5 ml/g.

It was shown that the carbon dioxide-absorbing capacity of the zeolite was superior at an equilibrium pressure of 13200 Pa or less, compared to those of Comparative Examples 1 to 5. In particular, the zeolite was superior to the absorbents of the Comparative Examples in the low-pressure ranges at 300 Pa and 10 Pa. In addition, the chemical absorption volume thereof was very favorable at 10 Pa.

It is because, as the Ba—O—Ba species interacts strongly with carbon dioxide, the ZSM-5 zeolite according to the present invention absorbs carbon dioxide tightly, permitting absorption of a large volume of carbon dioxide even under a condition where the equilibrium pressure is low, i.e., carbon dioxide is dilute.

Example 6

Preparative Method

A SrZSM-5 zeolite was prepared, by ion-exchanging ZSM-5 zeolite with an aqueous $SrCl_2$ solution as ion exchange solution and cleaning and drying the resulting zeolite.

(Results)

The preparative conditions and the test results of carbon dioxide-absorbing properties in the present Example are shown in Table 1. The ion exchange rate was 155%. FT-IR analysis using the absorbed acetylene as probe confirmed the presence of Sr—O—Sr species.

After the zeolite was heat-treated and then cooled to 25° C., the carbon dioxide-absorbing properties of the zeolite was evaluated, showing that the carbon dioxide-absorbing capacity was 75.0 cc/g at 132000 Pa, 39.0 ml/g at 13200 Pa, 26.3 ml/g at 300 Pa, and 16.0 cc/g at 10 Pa. The chemical absorption volume at 10 Pa was 8.0 ml/g.

It was shown that the carbon dioxide-absorbing capacity of the zeolite was superior at an equilibrium pressure of 13200 Pa or less, compared to those of Comparative Examples 1 to 5. In particular, the zeolite was superior to the absorbents of the Comparative Examples in the low-pressure ranges at 300 Pa and 10 Pa. In addition, the chemical absorption volume thereof was very favorable at 10 Pa.

It is because, as the Sr—O—Sr species interacts strongly with carbon dioxide, the ZSM-5 zeolite according to the present invention absorbs carbon dioxide tightly, permitting absorption of a large volume of carbon dioxide even under a condition where the equilibrium pressure is low, i.e., carbon dioxide is dilute.

The carbon dioxide-absorbing capacity thereof was higher than that of Example 1, probably because Sr, which has an electric field effect higher than that of Ba, interacted with carbon dioxide more effectively.

Example 7

Preparative Method

A SrZSM-5 zeolite was prepared by ion-exchanging ZSM-5 zeolite with an aqueous $SrCl_2$ solution as ion exchange solution and cleaning and drying the resulting zeolite.
(Results)

The preparative conditions and the test results of carbon dioxide-absorbing properties in the present Example are shown in Table 1. The ion exchange rate was 115%. FT-IR analysis using the absorbed acetylene as probe confirmed the presence of Sr—O—Sr species.

After the zeolite was heat-treated and then cooled to 25° C., the carbon dioxide-absorbing properties of the zeolite was evaluated, showing that the carbon dioxide-absorbing capacity was 69.4 cc/g at 132000 Pa, 36.0 ml/g at 13200 Pa, 22.9 ml/g at 300 Pa, and 12.3 cc/g at 10 Pa. The chemical absorption volume at 10 Pa was 4.8 ml/g.

It was shown that the carbon dioxide-absorbing capacity of the zeolite was superior at an equilibrium pressure of 13200 Pa or less, compared to those of Comparative Examples 1 to 5. In particular, the zeolite was superior to the absorbents of the Comparative Examples in the low-pressure ranges at 300 Pa and 10 Pa. In addition, the chemical absorption volume thereof was very favorable at 10 Pa.

It is because, as the Sr—O—Sr species interacts strongly with carbon dioxide, the ZSM-5 zeolite according to the present invention absorbs carbon dioxide tightly, permitting absorption of a large volume of carbon dioxide even under a condition where the equilibrium pressure is low, i.e., carbon dioxide is dilute.

The carbon dioxide-absorbing capacity thereof was lower than that of Example 6, probably because the ion exchange rate was relatively low.

Comparative Example 1

Preparative Method

A Na-A zeolite similar to that described in Patent Document 1, a product of conventional technology, was used as the absorbent.
(Results)

The preparative conditions and the test results of carbon dioxide-absorbing properties in the present Comparative Example are shown in Table 2. FT-IR analysis of the Na-A zeolite, using absorbed acetylene as probe did not confirm the presence of Na—O—Na species.

Evaluation of the carbon dioxide-absorbing properties showed that the carbon dioxide-absorbing capacity was 38.0 cc/g at 132000 Pa, 18.0 ml/g at 13200 Pa, 7.2 ml/g at 300 Pa, and 3.2 cc/g at 10 Pa. The chemical absorption volume at 10 Pa was 0.8 ml/g.

The carbon dioxide-absorbing capacity of the absorbent was lower than that in Examples in all equilibrium pressure ranges. It is probably because, as there is no M-O-M species that interacts strongly with carbon dioxide, the carbon dioxide absorption activity thereof is lower, particularly under a condition where the equilibrium pressure is low, i.e., carbon dioxide is dilute.

Comparative Example 2

Preparative Method

Similarly to the description in Patent Document 2, a BaY zeolite was prepared by ion-exchanging Y zeolite with an aqueous $BaCl_2$ solution as ion exchange solution and cleaning and drying the resulting zeolite.
(Results)

The preparative conditions and the test results of carbon dioxide-absorbing properties in the present Comparative Example are shown in Table 2. The ion exchange rate was 11.5%. The ion exchange rate did not increase from the level, even when the ion exchange condition (exchange frequency, solution concentration, solution temperature, etc.) was altered, possibly because the zeolite used was a Y-type zeolite.

It should thus be noted that it may not be possible, as in the present Comparative Example, to increase the ion exchange rate from a particular level, even if, in preparation of an absorbent, the ion exchange condition is altered, for example by increasing the frequency of ion exchange, increasing the concentration of the ion exchange solution, or raising the temperature for increase of the ion exchange rate. FT-IR analysis of the zeolite using absorbed acetylene as probe did not confirm the presence of Ba—O—Ba species.

Figure 6A:
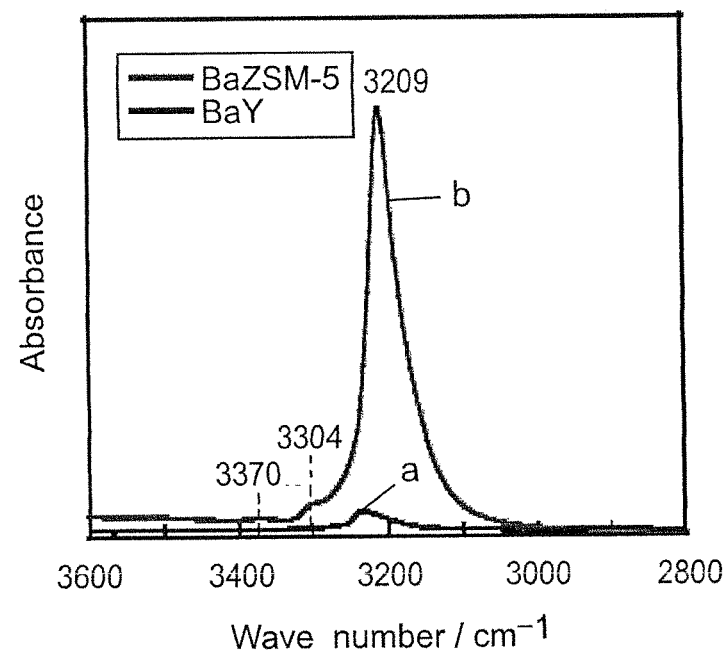
FIG. 6A is a FT-IR spectrum of a comparative BaY zeolite containing acetylene absorbed as probe.
Figure 6B:
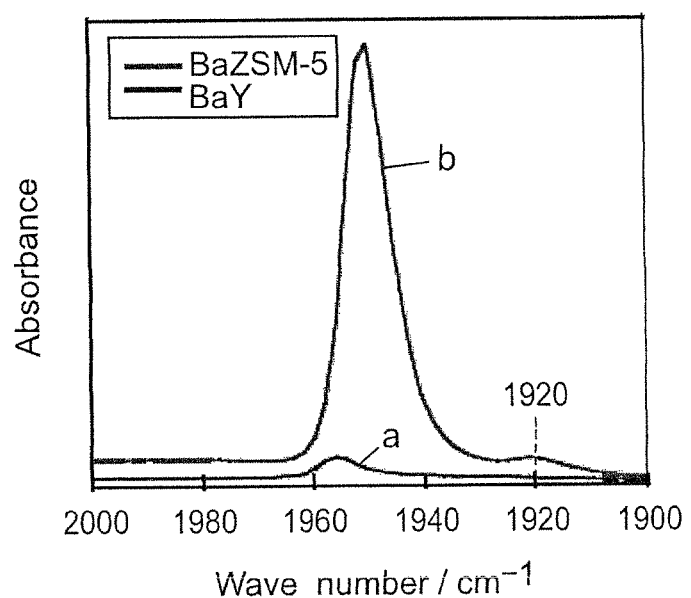
FIG. 6B is a FT-IR spectrum of another comparative BaY zeolite containing acetylene absorbed as probe.

The acetylene-probe FT-IR spectrum of the BaY zeolite of Comparative Example 2 and the spectrum of a BaZSM-5 zeolite according to the present invention are compared in FIGS. 6A and 6B. In the Figures, the spectrum of BaY is indicated by "a" and that of BaZSM-5 by "b".

In the acetylene probe FT-IR spectra of the BaY zeolite of FIGS. 6A and 6B, there was no IR bands at 3304 $cm^{-1}$ and 1920 $cm^{-1}$ corresponding to acetylide species and no IR band at 3370 $cm^{-1}$ corresponding to the OH stretching vibration of H—C≡C—Ba—(OH) that were found to be present in the BaZSM-5 zeolite according to the present invention, indicating that there was no Ba—O—Ba species formed in the BaY zeolite.

Evaluation of the carbon dioxide-absorbing properties showed that the carbon dioxide-absorbing capacity was 22.6 cc/g at 132000 Pa, 5.1 ml/g at 13200 Pa, 0.4 ml/g at 300 Pa, and 0.05 cc/g at 10 Pa. The chemical absorption volume at 10 Pa was 0 ml/g.

The carbon dioxide-absorbing capacity of the absorbent was lower than that in Examples in all equilibrium pressure ranges. It is probably because, as there is no M-O-M species that interacts strongly with carbon dioxide, the carbon dioxide absorption activity thereof is lower, particularly under a condition where the equilibrium pressure is low, i.e., carbon dioxide is dilute.

Comparative Example 3

Preparative Method

A 13X zeolite similar to that of Patent Document 3 was used as the absorbent.

(Results)

The preparative conditions and the test results of carbon dioxide-absorbing properties in the present Comparative Example are shown in Table 2. FT-IR analysis of the 13X zeolite using absorbed acetylene as probe did not confirm the presence of M-O-M species.

Evaluation of the carbon dioxide-absorbing properties showed that the carbon dioxide-absorbing capacity was 140 cc/g at 132000 Pa, 33.2 ml/g at 13200 Pa, 14.0 ml/g at 300 Pa, and 3.2 cc/g at 10 Pa. The chemical absorption volume at 10 Pa was 0.1 ml/g.

It was found that the zeolite had a very favorable absorption volume at 132000 Pa, indicating favorable absorption properties in pressurized range, but had a carbon dioxide-absorbing capacity lower than the zeolites of Examples in an equilibrium pressure range lower than atmospheric pressure. It is probably because, as there is no M-O-M species that interacts strongly with carbon dioxide, the carbon dioxide absorption activity thereof is lower, particularly under a condition where the equilibrium pressure is low, i.e., carbon dioxide is dilute.

Comparative Example 4

Preparative Method

A MgZSM-5 zeolite was prepared by ion-exchanging ZSM-5 zeolite with an aqueous $Mg(NO_3)_2$ solution as ion exchange solution and cleaning and drying the resulting zeolite.

(Results)

The preparative conditions and the test results of carbon dioxide-absorbing properties in the present Comparative Example are shown in Table 2. The ion exchange rate thereof was 48% and it was not possible to increase the ion exchange rate from the level even if the ion exchange condition (exchange frequency, solution concentration, solution temperature, etc.) was altered, possibly because the ion exchanged is Mg. FT-IR analysis thereof using absorbed acetylene as probe did not confirm the presence of Mg—O—Mg species.

Evaluation of the carbon dioxide-absorbing properties at 25° C. similarly to Examples above showed that the carbon dioxide-absorbing capacity was 58.0 cc/g at 132000 Pa, 32.5 ml/g at 13200 Pa, 16.5 ml/g at 300 Pa, and 4.0 cc/g at 10 Pa. The chemical absorption volume at 10 Pa was 1.1 ml/g.

The carbon dioxide-absorbing capacity of the absorbent was lower than that in Examples in all equilibrium pressure ranges. It is probably because, as there is no M-O-M species that interacts strongly with carbon dioxide, the carbon dioxide absorption activity thereof is lower, particularly under a condition where the equilibrium pressure is low, i.e., carbon dioxide is dilute.

Comparative Example 5

Preparative Method

A CaZSM-5 zeolite was prepared by ion-exchanging ZSM-5 zeolite with an aqueous $Ca(CH_3COO)_2$ solution as ion exchange solution and cleaning and drying the resulting zeolite.

(Results)

The preparative conditions and the test results of carbon dioxide-absorbing properties in the present Comparative Example are shown in Table 2. The ion exchange rate thereof was 51% and it was not possible to increase the ion exchange rate from the level even if the ion exchange condition (exchange frequency, solution concentration, solution temperature, etc.) was altered, possibly because the ion exchanged is Ca. FT-IR analysis thereof using absorbed acetylene as probe did not confirm the presence of Ca—O—Ca species.

Evaluation of the carbon dioxide-absorbing properties at 25° C. similarly to Examples above showed that the carbon dioxide-absorbing capacity was 58.3 cc/g at 132000 Pa, 33.5 ml/g at 13200 Pa, 17.8 ml/g at 300 Pa, and 4.1 cc/g at 10 Pa. The chemical absorption volume at 10 Pa was 1.2 ml/g.

The carbon dioxide-absorbing capacity of the absorbent was lower than that in Examples in all equilibrium pressure ranges. It is probably because, as there is no M-O-M species that interacts strongly with carbon dioxide, the carbon dioxide absorption activity thereof is lower, particularly under a condition where the equilibrium pressure is low, i.e., carbon dioxide is dilute.

TABLE 1

|  | Example 1 | Example 2 | Example 3 | Example 4 | Example 5 | Example 6 | Example 7 |
|---|---|---|---|---|---|---|---|
| Zeolite base material | ZSM-5 | ZSM-5 | ZSM-5 | ZSM-5 | ZSM-5 | ZSM-5 | ZSM-5 |
| Kind of salt in ion exchange solution | $BaCl_2$ | $BaCl_2$ | $BaCl_2$ | $Ba(NO_3)_2$ | $Ba(CH_3COO)_2$ | $SrCl_2$ | $SrCl_2$ |
| Ion exchange rate (%) | 150 | 120 | 80 | 110 | 117 | 156 | 116 |
| Presence of M-O-M group by acetylene absorption | Yes | Yes | Yes | Yes | Yes | Yes | Yes |
| $CO_2$ absorption (ml/g) at 132000 Pa | 73.1 | 64.8 | 59.0 | 70.1 | 62.5 | 75.0 | 69.4 |
| $CO_2$ absorption (ml/g) at 13200 Pa | 37.0 | 35 | 32.0 | 37.0 | 34.5 | 39.0 | 36.0 |
| $CO_2$ absorption (ml/g) at 300 Pa | 24.7 | 23.8 | 19.0 | 25.2 | 23.6 | 26.3 | 22.9 |
| $CO_2$ absorption (ml/g) at 10 Pa | 13.4 | 11.5 | 6.2 | 12.0 | 10.9 | 16.0 |  |
| Chemical absorption (ml/g) at 10 Pa | 7.2 | 4.8 | 3.4 | 5.7 | 4.5 | 8.0 | 4.8 |

TABLE 2

|  | Comparative Example 1 | Comparative Example 2 | Comparative Example 3 | Comparative Example 4 | Comparative Example 5 |
|---|---|---|---|---|---|
| Zeolite base material | Na-A | Y | 13X | ZSM-5 | ZSM-5 |
| Kind of salt in ion exchange solution | — | $BaCl_2$ | — | $Mg(NO_3)_2$ | $Ca(CH_2COO)_2$ |
| Ion exchange rate (%) | — | 11.5 | — | 48 | 51 |
| Presence of M-O-M group by acetylene absorption | NO | NO | NO | NO | NO |
| $CO_2$ absorption (ml/g) at 132000 Pa | 38.0 | 22.6 | 140 | 58.0 | 58.3 |
| $CO_2$ absorption (ml/g) at 13200 Pa | 18.0 | 5.1 | 33.2 | 32.5 | 33.5 |
| CO2 absorption (ml/g) at 300 Pa | 7.2 | 0.4 | 14.0 | 16.5 | 17.8 |
| $CO_2$ absorption (ml/g) at 10 Pa | 3.2 | 0.05 | 3.3 | 4 | 4.1 |
| Chemical absorption (ml/g) at 10 Pa | 0.8 | 0 | 0.1 | 1.1 | 1.2 |

As shown in Table 1, the carbon dioxide absorbent according to the present invention is a high-activity carbon dioxide absorbent that can absorb and remove carbon dioxide effectively even in dilute carbon dioxide condition.

It is because, as M atoms are positively polarized ($\delta^+$) and O present between M atoms is negatively polarized ($\delta^-$) in the M-O-M species while C atom (carbon) is positively polarized ($\delta^+$) and O atoms negatively polarized ($\delta^-$) in carbon dioxide molecule, the O atoms in carbon dioxide molecule interact electrostatically with the M atoms, leading to molecular absorption of carbon dioxide on the M atoms by the interaction, and the positively polarized C atom ($\delta^+$) in carbon dioxide molecule interacts electrostatically additionally with the negatively polarized O atom ($\delta^-$) present between M atoms, permitting further efficient absorption of carbon dioxide.

As a result, the zeolite shows favorable absorption properties even under dilute carbon dioxide environment and also strong chemical absorption resistant to release of carbon dioxide even under vacuum evacuation.

In addition, ZSM-5 zeolites having a Ba or Sr ion exchange rate of 80% or more have a favorable carbon dioxide-absorbing capacity, particularly in the range where the carbon dioxide equilibrium pressure is lower than atmospheric pressure.

On the other hand, the zeolites of Comparative Examples 1 to 5, which do not contain M-O-M species, had a favorable carbon dioxide-absorbing capacity in the range where the equilibrium pressure is 132000 Pa, but could not have a capacity comparative to that in Examples in the range where the equilibrium pressure is lower than atmospheric pressure.

The results above indicate that the carbon dioxide absorbent according to the present invention, which contains a M-O-M species, absorbs carbon dioxide tightly even in dilute carbon dioxide condition and permits absorption of a large volume of carbon dioxide.

INDUSTRIAL APPLICABILITY

As described above, the carbon dioxide absorbent according to the present invention can absorb carbon dioxide in a volume larger than that by conventional absorbents. As it absorbs carbon dioxide tightly and permits absorption of a large volume of carbon dioxide even under dilute carbon dioxide condition, it can be used, for example, in applications where a small amount of carbon dioxide is desirably removed more efficiently and also in applications where generation of carbonate salts from carbon dioxide is desirably inhibited.

What is claimed is:

1. A carbon dioxide absorbent, comprising at least a barium (Ba)- or strontium (Sr)-containing ZSM-5 zeolite,
   wherein the ZSM-5 zeolite contains a M-O-M species, wherein M is Ba or Sr, and O is oxygen, and
   wherein the ion exchange rate of the ZSM-5 zeolite with Ba or Sr is 80% or more.

2. An absorbent material, comprising at least a barium (Ba)- or strontium (Sr)-containing ZSM-5 zeolite,
   wherein the ZSM-5 zeolite contains a M-O-M species, wherein M is Ba or Sr, and O is oxygen,
   wherein the ion exchange rate of the ZSM-5 zeolite with Ba or Sr is 80% or more, and
   wherein the ZSM-5 zeolite contains acetylide species after absorption of acetylene.

* * * * *